(12) United States Patent
Raymond et al.

(10) Patent No.: US 7,500,475 B2
(45) Date of Patent: Mar. 10, 2009

(54) ENGINE AND METHOD FOR OPERATING AN ENGINE

(75) Inventors: Max Brian Raymond, Peterborough (GB); Michael Robert Stott, Market Deeping (GB); Nicholas John Richards, Peterborough (GB); Andrew Oliver, Peterborough (GB); Wei Cai, Cambridge (GB)

(73) Assignee: Perkins Engines Company Limited, Peterborough (GB)

( * ) Notice: Subject to any disclaimer, the term of this patent is extended or adjusted under 35 U.S.C. 154(b) by 28 days.

(21) Appl. No.: 11/519,810

(22) Filed: Sep. 13, 2006

(65) Prior Publication Data

US 2008/0060625 A1    Mar. 13, 2008

(51) Int. Cl.
*F02M 25/07* (2006.01)
*F02B 47/08* (2006.01)
*F01L 1/34* (2006.01)

(52) U.S. Cl. .............................. 123/568.14; 123/90.15; 123/316

(58) Field of Classification Search ............. 123/90.11, 123/90.15–90.18, 316, 27 R, 568.11, 568.14; 60/285
See application file for complete search history.

(56) References Cited

U.S. PATENT DOCUMENTS

| | | | |
|---|---|---|---|
| 3,019,777 A | 2/1962 | Candelise | |
| 3,814,065 A | 6/1974 | Gospodar | |
| 4,722,315 A | 2/1988 | Pickel | |
| 4,724,809 A | 2/1988 | Burandt | |
| 5,161,497 A * | 11/1992 | Simko et al. ............. | 123/90.15 |
| 5,224,460 A | 7/1993 | Havstad et al. | |
| 6,173,567 B1 | 1/2001 | Poola et al. | |
| 6,305,335 B1 | 10/2001 | O'Toole | |
| 6,325,043 B1 | 12/2001 | Meistrick et al. | |
| 6,736,106 B2 | 5/2004 | Reitz et al. | |
| 6,769,392 B2 | 8/2004 | Lawrence et al. | |
| 6,772,742 B2 * | 8/2004 | Lei et al. ............... | 123/568.14 |
| 6,807,956 B2 | 10/2004 | Gaessler et al. | |
| 7,150,250 B2 * | 12/2006 | Kuo et al. ................ | 123/90.15 |
| 7,204,214 B2 * | 4/2007 | Miyaji et al. ............. | 123/90.15 |

(Continued)

FOREIGN PATENT DOCUMENTS

AT    003 207 U1    11/1999

(Continued)

OTHER PUBLICATIONS

Iveco Motors, Iveco Motors' Research and Development, first copy printed on Jan. 1, 2004 and second copy printed from the internet on Sep. 21, 2006.

*Primary Examiner*—Willis R Wolfe, Jr.
(74) *Attorney, Agent, or Firm*—Finnegan, Henderson, Farabow, Garrett & Dunner

(57) ABSTRACT

A method of operating an engine is provided. The engine may include a housing having a combustion chamber, a piston disposed adjacent the combustion chamber, a crankshaft connected to the piston, an intake valve associated with the combustion chamber, and an exhaust valve associated with the combustion chamber. The method may also include opening the intake valve after a power stroke of the piston begins and closing the intake valve before the exhaust stroke ends. Furthermore, the method may include causing the exhaust valve to be open for part of an intake stroke of the piston and closing the exhaust valve at least about 30 degrees of crankshaft rotation after the intake stroke begins.

45 Claims, 8 Drawing Sheets

U.S. PATENT DOCUMENTS

| | | |
|---|---|---|
| 7,249,597 B2 * | 7/2007 | Muller et al. .......... 123/568.14 |
| 2003/0164163 A1 | 9/2003 | Lei et al. |
| 2004/0089250 A1 | 5/2004 | Iwashita et al. |
| 2004/0231639 A1 | 11/2004 | Israel et al. |
| 2005/0076890 A1 | 4/2005 | Seitz et al. |
| 2005/0120996 A1 | 6/2005 | Gaessler et al. |
| 2006/0005788 A1 | 1/2006 | Kuo et al. |
| 2006/0027208 A1 | 2/2006 | Pinkston |
| 2006/0102157 A1 | 5/2006 | Muller et al. |

FOREIGN PATENT DOCUMENTS

| | | |
|---|---|---|
| AT | 003 207 U1 | 12/2004 |
| DE | 10 2005 032 791 | 1/2007 |
| EP | 1 508 676 | 2/2005 |
| WO | WO 2006/110709 | 10/2006 |

* cited by examiner

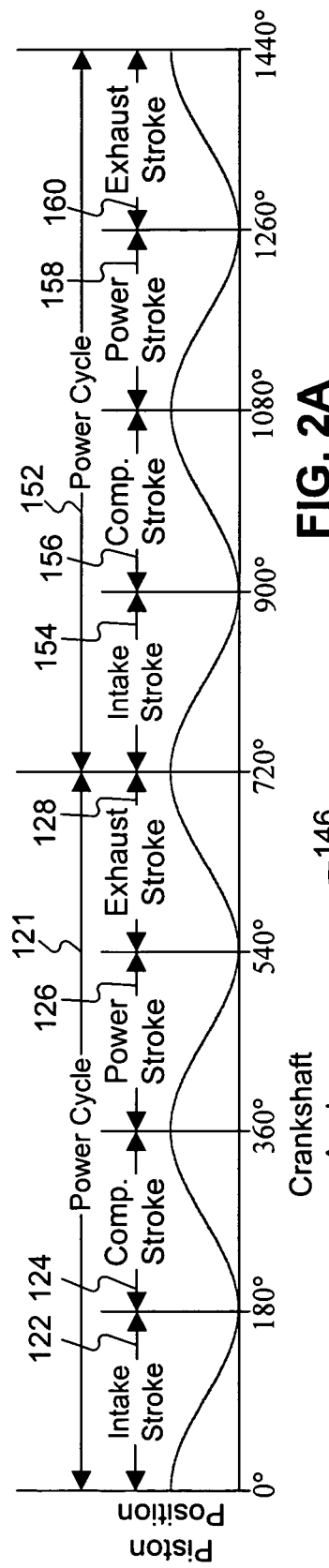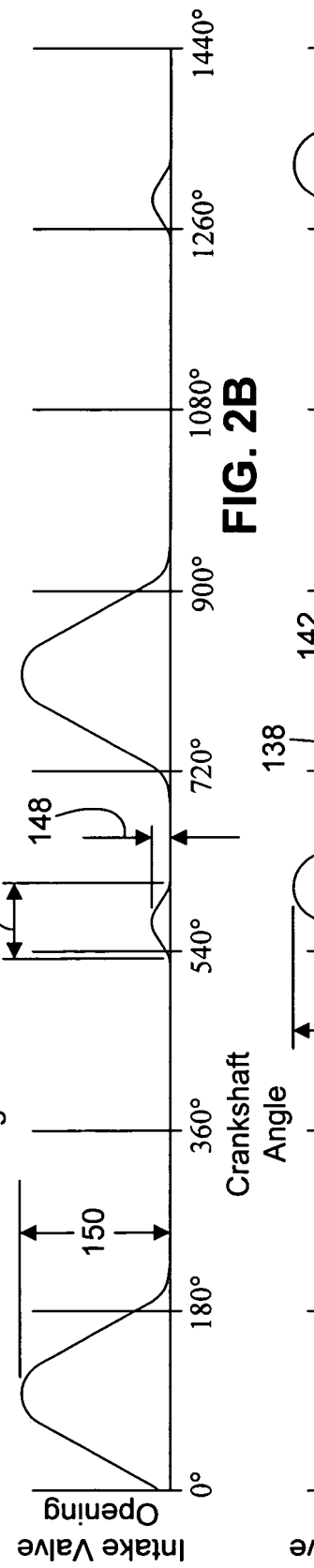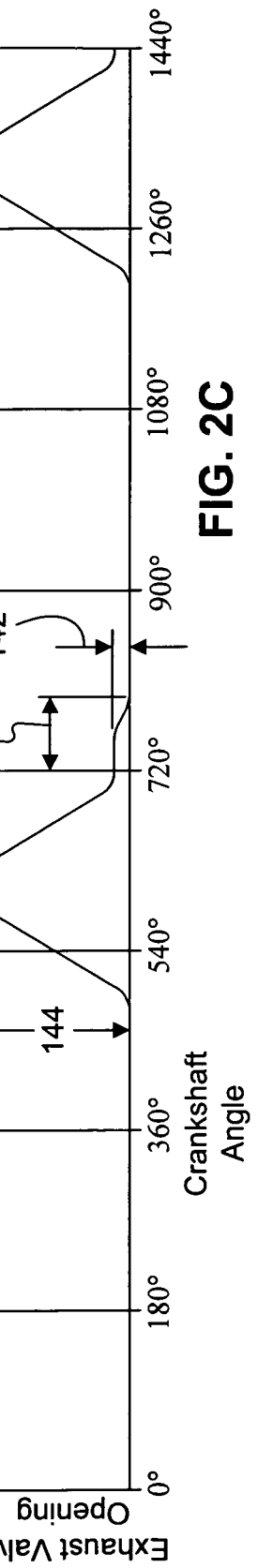

ENGINE AND METHOD FOR OPERATING AN ENGINE

TECHNICAL FIELD

The present disclosure relates to methods of operating engines and, more particularly, to methods of causing power cycles in engines.

BACKGROUND

Many engines combust fuel in a combustion chamber to drive a piston. In many cases, an engine combusts fuel in a combustion chamber as part of a power cycle that includes directing air from an intake system into the combustion chamber, combusting the fuel with the air in the combustion chamber to produce combustion gas that drives a piston, and discharging the combustion gas from the combustion chamber into an exhaust system. In some cases, the engine includes an external exhaust gas recirculation system for directing combustion gas from the exhaust system to the intake system to be returned to the combustion chamber. Unfortunately, in some circumstances, such an external exhaust gas recirculation system may fail to deliver combustion gas to the intake system. For example, in some circumstances, a supercharger may drive the pressure in the intake system higher than the pressure in the exhaust system, which may inhibit delivering combustion gas to the air intake system through the external exhaust gas recirculation system.

Published U.S. Patent Application No. 2005/0076890 A1 to Seitz et al. ("the '890 application") shows a method of internally recirculating combustion gas. The '890 application discloses opening an exhaust valve of an engine approximately 160 degrees after top dead center of a power stroke of the engine. The '890 application also discloses executing an intake valve prestroke wherein an intake valve of the engine is opened between 180 and 210 degrees after the beginning of a power stroke of the engine. The '890 application discloses that, in some limited circumstances, there is a positive pressure difference between the combustion chamber associated with the intake valve and an intake system of the engine during the intake valve prestroke. This positive pressure difference drives combustion gas from the combustion chamber into the intake system of the engine during the intake valve prestroke disclosed by the '890 application.

Although the method of the '890 application includes directing combustion gas from the combustion chamber into the intake system by opening the intake valve during the exhaust stroke, certain disadvantages persist. For example, in at least some applications and/or circumstances, executing the method disclosed by the '890 application may entail compromising between heating air in the intake system to undesirably high temperatures and delivering an undesirably small amount of combustion gas to the intake system. Opening the intake valve in a manner to deliver a large quantity of combustion gas into the intake system may provide certain advantages. However, introducing a large quantity of combustion gas into the intake system may heat air in the intake system to undesirably high temperatures. Conversely, limiting the amount of combustion gas that enters intake system to prevent undesirably heating air in the intake system may have certain drawbacks, such as causing the engine to produce undesirably large quantities of $NO_x$ in some circumstances.

The engine and methods of the present disclosure solve one or more of the problems set forth above.

SUMMARY OF THE INVENTION

One disclosed embodiment relates to a method of operating an engine. The engine may include a housing having a combustion chamber, a piston disposed adjacent the combustion chamber, a crankshaft connected to the piston, an intake valve associated with the combustion chamber, and an exhaust valve associated with the combustion chamber. The method may include opening the intake valve after a power stroke of the piston begins and closing the intake valve before a subsequent exhaust stroke of the piston ends. Additionally, the method may include causing the exhaust valve to be open for part of an intake stroke of the piston and closing the exhaust valve at least about 30 degrees of crankshaft rotation after the intake stroke begins.

Another embodiment relates to a method of operating an engine. The engine may include a housing having a combustion chamber, a piston disposed adjacent the combustion chamber, a crankshaft connected to the piston, an intake valve associated with the combustion chamber, and an exhaust valve associated with the combustion chamber. The method may also include causing the exhaust valve to be open for at least a portion of an intake stroke of the piston, including substantially plateauing the opening of the exhaust valve for at least a portion of the intake stroke, and closing the exhaust valve before the intake stroke ends.

A further embodiment relates to an engine that includes a housing having a combustion chamber. The engine may also include a piston disposed adjacent the combustion chamber and a crankshaft connected to the piston. Additionally, the engine may include engine controls, including an exhaust valve associated with the combustion chamber. The engine controls may also be operable to cause an intake stroke of the piston following the exhaust stroke. Additionally, the engine controls may be operable to, after an exhaust stroke of the piston begins, reduce an opening of the exhaust valve, then increase the opening of the exhaust valve, before closing the exhaust valve after a subsequent intake stroke of the piston begins.

Another embodiment relates to a method of operating an engine, the engine having a housing with a combustion chamber, a piston disposed adjacent the combustion chamber, and a crankshaft connected to the piston. The method may include, in at least some circumstances, providing at least about 5 percent internal combustion gas recirculation from an intake system of the engine to the combustion chamber. The method may also include, in at least some circumstances, providing at least about 5 percent internal combustion gas recirculation from an exhaust system of the engine to the combustion chamber.

A further embodiment relates to a method of operating an engine, the engine having a housing with a combustion chamber, a piston disposed adjacent the combustion chamber, and a crankshaft connected to the piston. The method may include providing internal combustion gas recirculation from an intake system of the engine to the combustion chamber in an amount correlated to engine speed and load. Additionally, the method may include providing internal combustion gas recirculation from an exhaust system of the engine to the combustion chamber in an amount correlated to engine speed and load.

Another embodiment relates to a method of operating an engine, the engine having a housing with a combustion chamber, a piston disposed adjacent the combustion chamber, and a crankshaft connected to the piston. The method may include opening an intake valve associated with the combustion chamber between about 15 degrees of crankshaft rotation before a power stroke of the piston ends and the end of the power stroke. The method may also include closing the intake valve before a subsequent exhaust stroke of the piston ends.

A further embodiment relates to a method of operating an engine, the engine having a housing with a combustion chamber, a piston disposed adjacent the combustion chamber, and a crankshaft connected to the piston. The method may include providing internal combustion gas recirculation from an intake system of the engine to the combustion chamber, including opening an intake valve associated with the combustion chamber after a power stroke of the piston begins and closing the intake valve before a subsequent exhaust stroke of the piston ends. Additionally, the method may include, in at least some circumstances, providing at least about 5 percent internal combustion gas recirculation from an exhaust system of the engine to the combustion chamber.

Another embodiment may relate to a method of operating an engine, the engine having a housing with a combustion chamber, a piston disposed adjacent the combustion chamber, and a crankshaft connected to the piston. The method may include providing a first amount of internal combustion gas recirculation from an intake system of the engine to the combustion chamber. The method may also include providing a second amount of internal combustion gas recirculation from an exhaust system of the engine to the combustion chamber, the second amount being at least about 50 percent of the first amount.

BRIEF DESCRIPTION OF THE DRAWINGS

FIG. 2A is a graphical illustration of motion of a piston of an engine over a period of time;

FIG. 2B is a graphical illustration of a method of controlling an intake valve of an engine over the same period of time shown in FIG. 2A;

FIG. 2C is a graphical illustration of a first method of controlling an exhaust valve of an engine over the same period of time shown in FIG. 2A;

DETAILED DESCRIPTION

Figure 1:
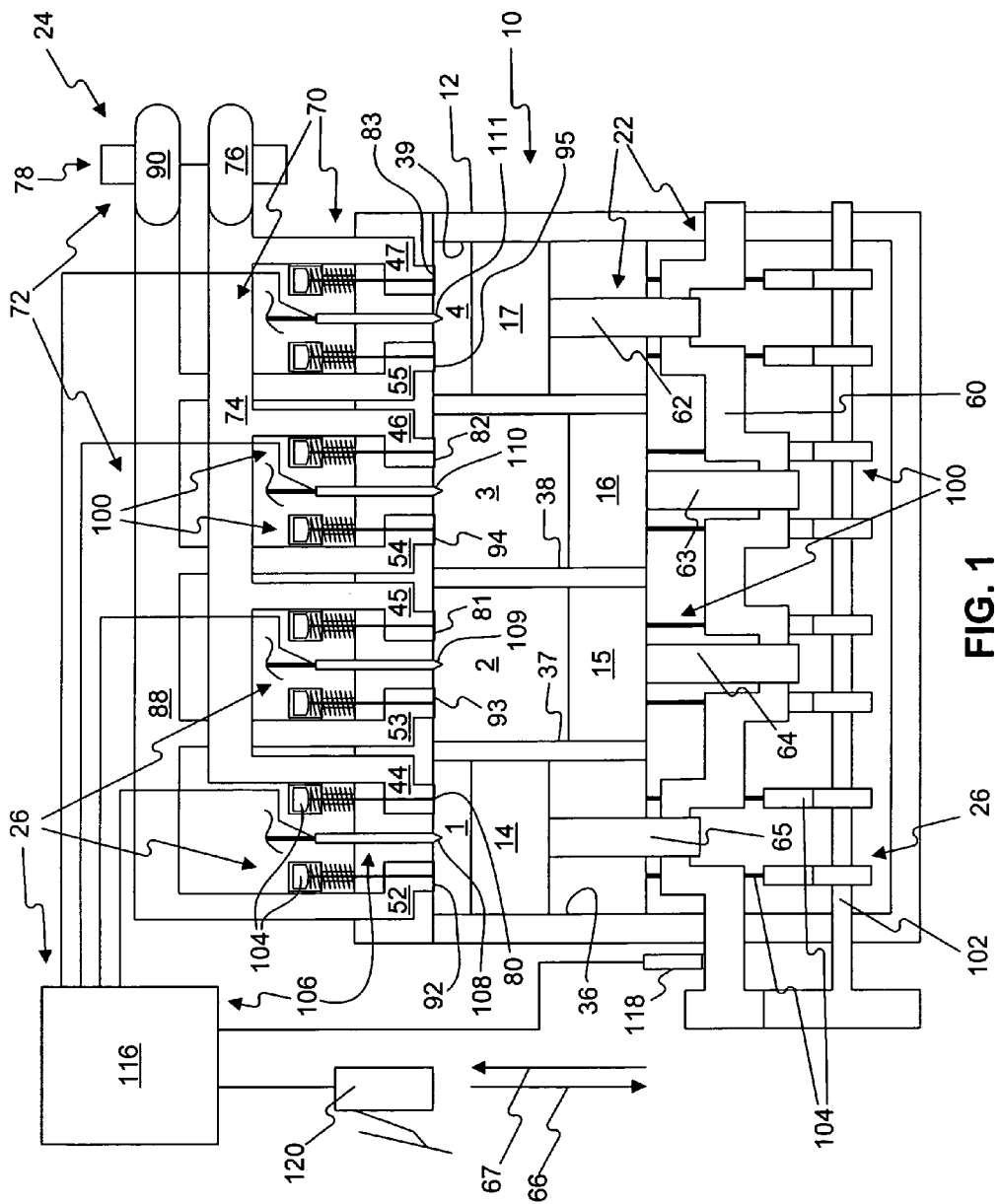
FIG. 1 is a schematic illustration of one embodiment of an engine according to the present disclosure.

FIG. 1 illustrates an engine 10 according to the present disclosure. Engine 10 may include a housing 12, pistons 14, 15, 16, 17, a power-transfer system 22, an aspiration system 24, and engine controls 26.

Housing 12 may include combustion chambers 1, 2, 3, 4, channels 36, 37, 38, 39, intake passages 44, 45, 46, 47, and exhaust passages 52, 53, 54, 55. Channels 36-39 may extend from combustion chambers 1-4. Channels 36-39 may be, for example, cylinders. Intake passages 44-47 may extend from combustion chambers 1-4, respectively, to an exterior surface of housing 12. Similarly, exhaust passages 52-55 may extend from combustion chambers 1-4, respectively, to an exterior surface of housing 12. As FIG. 1 shows, housing 12 may be constructed of multiple components fastened together. Alternatively, housing 12 may have a one-piece construction.

Pistons 14, 15, 16, 17 may be disposed adjacent combustion chambers 1, 2, 3, 4, respectively, within channels 36, 37, 38, 39, respectively. Side surfaces of each channel 36, 37, 38, 39 may guide the piston 14, 15, 16, 17 disposed therein so that the piston 14, 15, 16, 17 may slide in either a direction 66 or a direction 67 parallel to the side surfaces of the channel 36, 37, 38, 39.

Power-transfer system 22 may be configured to transfer power between pistons 14-17 and other components. Power-transfer system 22 may include a crankshaft 60 and connecting rods 62, 63, 64, 65 connecting pistons 14, 15, 16, 17 to crankshaft 60.

The general configuration of engine 10 is not limited to the one shown in FIG. 1. For example, engine 10 may omit one or more of combustion chambers 1-4, one or more of channels 36-39, and one or more of pistons 14-17; or engine 10 may include additional combustion chambers, channels, and pistons. Additionally, while FIG. 1 shows combustion chambers 1-4 and channels 36-39 arranged in an inline configuration, engine 10 may have its combustion chambers and channels arranged in any other configuration, including, but not limited to, a "V" configuration, a horizontally opposed configuration, and a radial configuration.

Aspiration system 24 may include an intake system 70 and an exhaust system 72. Intake system 70 may be configured to deliver air and/or other fluids to combustion chambers 1-4. Intake system 70 may include intake passages 44-47, an intake manifold 74 fluidly connected to intake passages 44-47, and a compressor unit 76 of a turbocharger 78. Intake system 70 may also include intake valves 80, 81, 82, 83 associated with combustion chambers 1, 2, 3, 4, respectively. Intake valves 80-83 may be any types of valves operable to control fluid flow between combustion chambers 1-4 and intake system 70. In some embodiments, intake valves 80-83 may be poppet valves.

Exhaust system 72 may be configured to direct combustion gas away from combustion chambers 1-4. Exhaust system 72 may include exhaust passages 52-55, an exhaust manifold 88 fluidly connected to exhaust passages 52-55, and a turbine unit 90 of turbocharger 78. Exhaust system 72 may also include exhaust valves 92, 93, 94, 95 associated with combustion chambers 1, 2, 3, 4, respectively. Exhaust valves 92-95 may be any types of valves operable to control fluid flow between combustion chambers 1-4 and exhaust system 72. In some embodiments, exhaust valves 92-95 may be poppet valves.

Aspiration system 24 may also include a valve-control system 100 for controlling intake valves 80-83 and exhaust valves 92-95. Valve-control system 100 may be any system of components operable to control intake valves 80-83 and exhaust valves 92-95 in the manners described hereinbelow. In embodiments where intake valves 80-83 and exhaust valves 92-95 are poppet valves, valve-control system 100 may include various types of actuators for controlling the positions of intake valves 80-83 and exhaust valves 92-95. In some embodiments, valve-control system 100 may include a system of mechanical actuators configured to control intake valves 80-83 and exhaust valves 92-95 as a function of rotation of crankshaft 60. For example, valve-control system 100 may include a camshaft 102 drivingly connected to crankshaft 60 and a valve train 104 connecting camshaft 102 to intake valves 80-83 and exhaust valves 92-95. Additionally, in some embodiments, valve-control system 100 may be configured to control intake valves 80-83 and exhaust valves 92-95 partially or wholly electronically.

Aspiration system 24 is not limited to the configuration shown in FIG. 1. For example, aspiration system 24 may omit various components shown in FIG. 1 and/or include various additional components, including, but not limited to, throttles, filters, heat exchangers, additional valves, additional turbochargers, other types of superchargers, mufflers, and exhaust-treatment devices. Additionally, valve-control system 100 may include other configurations of mechanical actuators for controlling intake valves 80-83 and exhaust valves 92-95 as a function of motion of pistons 14-17 and crankshaft 60. Furthermore, in some embodiments, valve-control system 100 may include provisions for controlling intake valves 80-83 and exhaust valves 92-95 partially or fully independently of rotation of crankshaft 60. For example, valve-control system 100 may include provisions for adjusting the relationships between crankshaft 60, camshaft 102, and the components of valve train 104 during operation. Furthermore, in addition to, or in place of, camshaft 102 and valve train 104, valve-control system 100 may include other actuators, such as hydraulic, pneumatic, electric, or magnetic actuators, for actuating intake valves 80-83 and exhaust valves 92-95.

Engine controls 26 may include intake valves 80-83, exhaust valves 92-95, valve-control system 100, and a fuel-metering system 106. Fuel-metering system 106 may include fuel-metering devices 108, 109, 110, 111 and a controller 116. Fuel-metering devices 108-111 may be connected to a fuel-supply system (not shown). Fuel-metering devices 108-111 may be any types of devices operable to meter fuel to combustion chambers 1-4. For example, fuel-metering devices 108-111 may be fuel injectors. As FIG. 1 shows, in some embodiments, each fuel-metering device 108, 109, 110, 111 may extend into one of combustion chambers 1, 2, 3, 4 so that it may discharge fuel directly into that combustion chamber 1, 2, 3, 4.

Controller 116 may be an information processor operable to control one or more components of engine 10 based on information from various sources. Controller 116 may include one or more processors (not shown) and one or more memory devices (not shown). Controller 116 may be operatively connected to fuel-metering devices 108-111 so that controller 116 may control how fuel-metering devices 108-111 meter fuel to combustion chambers 1-4. Controller 116 may be configured to control fuel-metering devices 108-111 dependent on information from various components operatively connected to controller 116. For example, controller 116 may control fuel-metering devices 108-111 dependent upon signals from a position/speed sensor 118 indicating the position and/or speed of crankshaft 60. Additionally, controller 116 may control fuel-metering devices 108-111 dependent upon inputs from an operator interface 120, such as inputs indicating a desired operating speed and/or power output of engine 10.

Engine controls 26 are not limited to the configuration shown in FIG. 1. For example, fuel-metering devices 108-111 may be positioned to deliver fuel into intake system 70, rather than directly into combustion chambers 1-4. Additionally, in some embodiments, engine controls 26 may omit one or more of fuel-metering devices 108-111 and/or include additional fuel-metering devices. Furthermore, in some embodiments, one or more of fuel-metering devices 108-111 may be a type of device other than a fuel injector, such as a carburetor. Additionally, in some embodiments, engine controls 26 may include a spark ignition system. Moreover, in place of controller 116, engine controls 26 may include various other types of controls, such as hard-wired circuits, hydraulic controls, pneumatic controls, and/or mechanical controls.

INDUSTRIAL APPLICABILITY

Engine 10 may have application wherever power is required to perform one or more tasks. Engine controls 26 may be operable to cause engine 10 to produce power by causing a succession of power cycles in each combustion chamber 1-4. Each power cycle in a combustion chamber 1-4 may include introducing air and fuel, combusting the fuel with the air to generate combustion gas that drives the adjacent piston 14-17, and discharging at least part of the combustion gas from the combustion chamber 1-4.

Figure 2D:
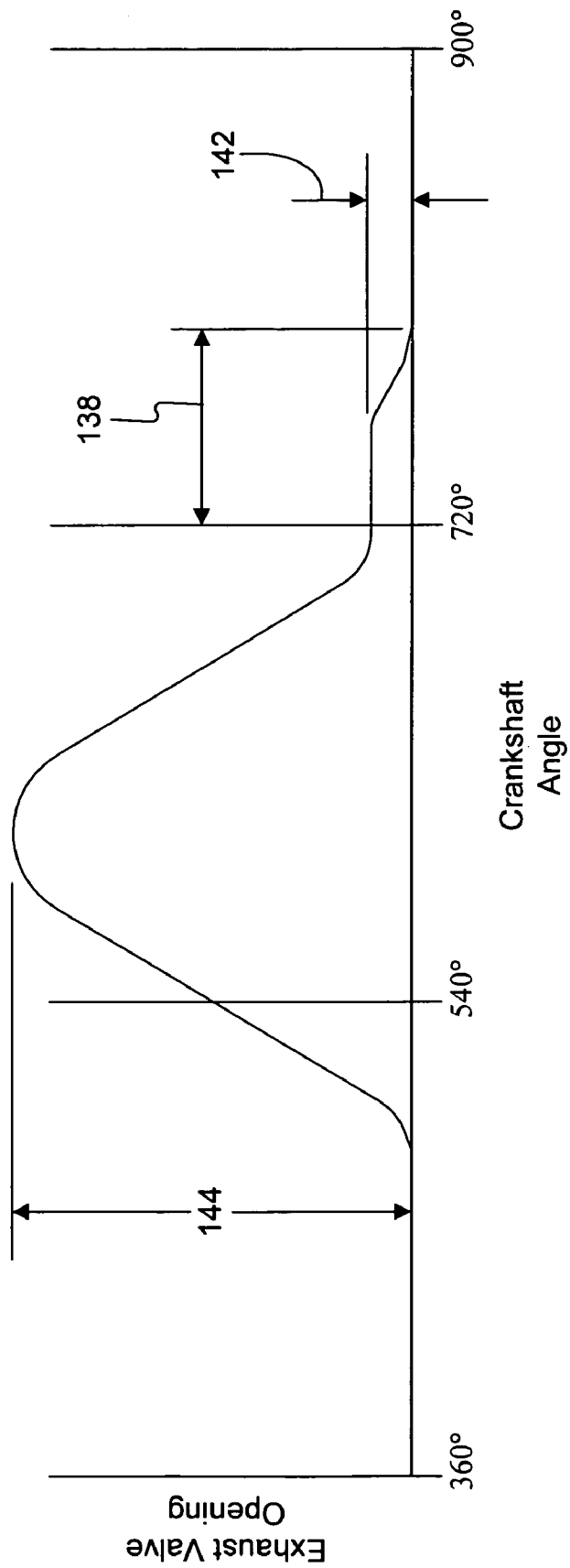
FIG. 2D is an enlarged view of a portion of FIG. 2C.

FIGS. 2A-2D illustrate one embodiment of a method that engine controls 26 may execute to cause power cycles in combustion chamber 1. FIG. 2A shows how piston 14 moves in channel 36 over the course of four revolutions of crankshaft 60. FIGS. 2B and 2C show how valve-control system 100 controls intake valve 80 and exhaust valve 92, respectively, over the time period shown in FIG. 2A. FIG. 2D provides an enlarged view of the portion of FIG. 2C showing the operation of exhaust valve 92 between the 360° and 900° positions of crankshaft 60.

A first power cycle 121 may include an intake stroke 122 of piston 14, a compression stroke 124 of piston 14, a power stroke 126 of piston 14, and an exhaust stroke 128 of piston 14. A second power cycle 152 may include another intake stroke 154, another compression stroke 156, another power stroke 158, and another exhaust stroke 160. During intake stroke 122 of piston 14, engine controls 26 may cause intake valve 80 to be open during at least a portion of a stroke of piston 14 in direction 66 (FIGS. 2A and 2B). During compression stroke 124 of piston 14, engine controls 26 may cause both intake valve 80 and exhaust valve 92 to be closed during at least a portion of a subsequent stroke of piston 14 in direction 67 (FIGS. 2A-C).

During the end of compression stroke 124 and/or the beginning of beginning of power stroke 126, engine controls 126 may cause combustion of fuel in combustion chamber 1, thereby generating combustion gas that drives piston 14 as it travels in direction 66 through power stroke 126. In some embodiments, fuel-metering device 108 may introduce the fuel into combustion chamber 1 during the end of compression stroke 124 and/or the beginning of power stroke 126. Depending upon the configuration of engine 10, engine controls 26 may rely on compression ignition to combust the fuel, or engine controls 26 may utilize spark ignition to combust the fuel.

Subsequent to power stroke 126, engine controls 26 may complete power cycle 121 with exhaust stroke 128 and begin power cycle 152 with intake stroke 154. During exhaust stroke 128, engine controls 26 may cause exhaust valve 92 to be open for at least a portion of a stroke of piston 14 in direction 67 following power stroke 126 (FIGS. 2A and 2C). During intake stroke 154, engine controls 26 may cause intake valve 80 to be open for at least a portion of a stroke of piston 14 in direction 66 following exhaust stroke 128. Engine controls 26 may then execute compression stroke 156, power stroke 158, and exhaust stroke 160 in substantially the same manner that engine controls 26 executed compression stroke 124, power stroke 126, and exhaust stroke 128.

As FIGS. 2C and 2E show, engine controls 26 may cause exhaust valve 92 to be open for a period 138 during intake stroke 154. In some embodiments, engine controls 26 may do so by holding exhaust valve 92 open after the end of exhaust stroke 128. Engine controls 26 may close exhaust valve 92 at least about 30 degrees of crankshaft rotation after intake stroke 154 begins. In some embodiments, engine controls 26 may close exhaust valve 92 at least about 40 degrees of crankshaft rotation after intake stroke 154 ends. Furthermore, in some embodiments, engine controls 26 may close exhaust valve 92 between about 50 and about 90 degrees of crankshaft rotation after exhaust stroke 128 ends and intake stroke 154 begins. In some embodiments, engine controls 26 may close exhaust valve 92 between about 60 and about 80 degrees of crankshaft rotation after exhaust stroke 128 ends and intake stroke 154 begins. Additionally, engine controls 26 may substantially plateau the opening of exhaust valve 92 during at least a portion of intake stroke 154. Engine controls 26 may, for example, plateau the opening of exhaust valve 92 at an amount 142 greater than about 5 percent of a peak opening 144 of exhaust valve 92 during exhaust stroke 128. In some embodiments, amount 142 may be greater than about 8 percent of peak opening 144. Additionally, in some embodiments, amount 142 may be less than about 20 percent of peak opening 144. Furthermore, in some embodiments, engine controls 26 may maintain the opening of exhaust valve 92 during intake stroke 154 less than about 20 percent of peak opening 144.

As FIG. 2B shows, during power cycle 121, engine controls 26 may also open intake valve 80 for a period 146 starting during power stroke 126 and ending during exhaust stroke 128. In some embodiments, engine controls 26 may open intake valve 80 less than about 30 degrees of crankshaft rotation before power stroke 126 ends. Additionally, in some embodiments, engine controls 26 may open intake valve 80 between about 15 degrees before power stroke 126 ends and the end of power stroke 126. Furthermore, engine controls 26 may, in some embodiments, close intake valve 80 between about 50 degrees and about 80 degrees of crankshaft rotation after exhaust stroke 128 begins. In some embodiments, engine controls 26 may close intake valve 80 at least about 65 degrees of crankshaft rotation after exhaust stroke 128 begins. Additionally, engine controls 26 may open intake valve 80 to a peak amount 148 that is between about 5 percent and about 20 percent of a peak opening 150 of intake valve 80 during intake stroke 122.

Figures 3A, 3B, 3C:
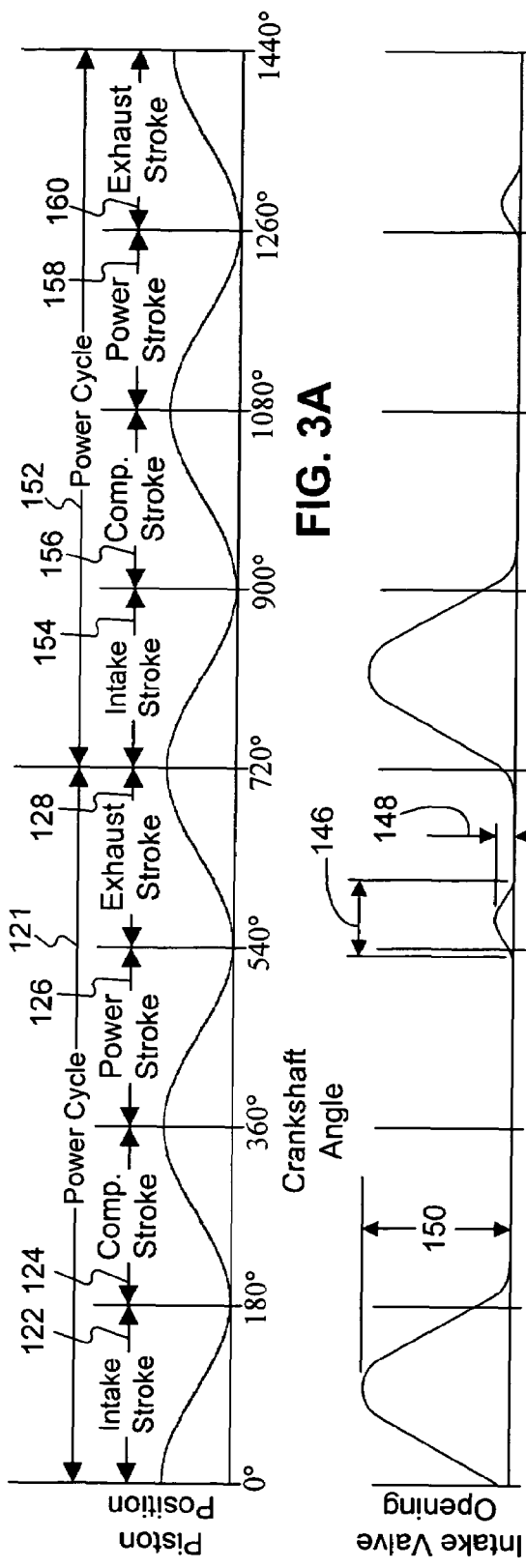
FIG. 3A is a graphical illustration of motion of a piston of an engine over the same period of time shown in FIG. 2A.
FIG. 3B is a graphical illustration of the same method of controlling an intake valve that is shown in FIG. 2B.
FIG. 3C is a graphical illustration of a second method of controlling an exhaust valve of an engine over the same period of time shown in FIGS. 2A and 3A.
Figure 3D:
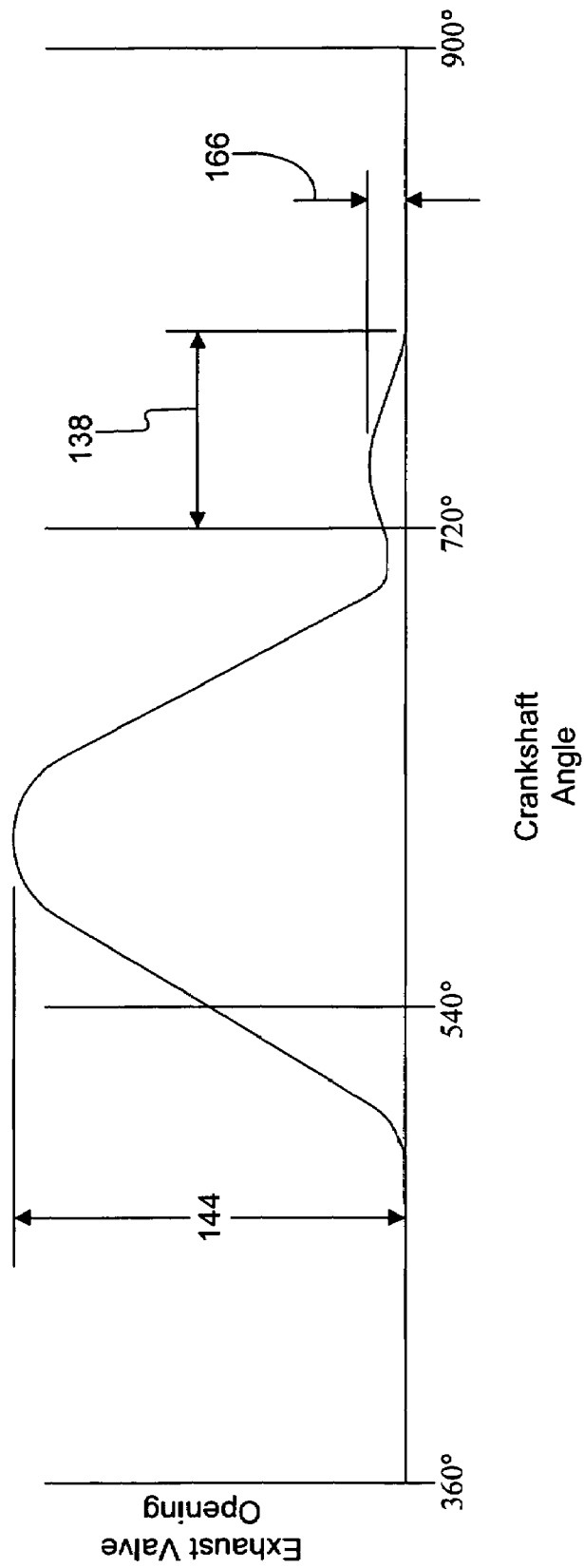
FIG. 3D is an enlarged view of a portion of FIG. 3C.

FIGS. 3A-3D illustrate another embodiment of a method that engine controls 26 may execute to cause power cycles in combustion chamber 1. The method shown in FIGS. 3A-3D replicates the method shown in FIGS. 2A-2D, except that engine controls 26 control exhaust valve 92 differently. As in the embodiment shown in FIGS. 2A-2D, engine controls 26 may cause exhaust valve 92 to be open for period 138. Additionally, as FIGS. 3C and 3E show, after exhaust stroke 128 begins, engine controls 26 may decrease the opening of exhaust valve 92, then increase the opening of exhaust valve 92, before closing exhaust valve 92 after intake stroke 154 begins. The amount that engine controls 26 decrease the opening of exhaust valve 92 before increasing the opening of exhaust valve 92 may vary dependent upon the embodiment and/or circumstances. Generally, engine controls 26 may decrease the opening of exhaust valve 92 at least enough to prevent piston 14 from colliding with exhaust valve 92 as piston 14 travels in direction 67 during exhaust stroke 128. Engine controls 26 may transition from decreasing the opening of exhaust valve 92 to increasing the opening of exhaust valve 92 between about 160 and about 200 degrees of crankshaft rotation after exhaust stroke 128 begins. Between transitioning from decreasing to increasing the opening of exhaust valve 92 and closing exhaust valve 92, engine controls 26 may peak the opening of exhaust valve 92 at an amount 166 of between about 5 percent and about 20 percent of peak opening 144 of exhaust valve 92 during exhaust stroke 128.

Engine controls 26 may close exhaust valve 92 at least about 30 degrees of crankshaft rotation after intake stroke 154 begins. In some embodiments, engine controls may delay closing exhaust valve 92 until at least about 40 degrees of crankshaft rotation after intake stroke 154 begins. Furthermore, in some embodiments, engine controls 26 may close exhaust valve 92 between about 50 and about 90 degrees of crankshaft rotation after intake stroke 154 begins. Additionally, in some embodiments, this range may narrow to between about 60 and about 80 degrees of crankshaft rotation after intake stroke 154 begins, or an even smaller range, depending upon the application.

Controlling intake valve 80 and exhaust valve 92 in the manners discussed above in connection with FIGS. 2A-2D and 3A-3D may provide internal combustion gas recirculation. Holding exhaust valve 92 open during period 138 may provide internal combustion gas recirculation from exhaust system 72 to combustion chamber 1 by allowing combustion gas to flow from exhaust passage 52 into combustion chamber 1 during period 138. Additionally, opening intake valve 80 during period 146 may provide internal combustion gas recirculation from intake system 70 to combustion chamber 1. During period 146, with intake valve 80 open, combustion gas may flow from combustion chamber 1 into intake passage 44. This combustion gas and/or combustion gas discharged into intake system 70 from other combustion chambers 2-4 during similar power cycles may flow from intake passage 44 into combustion chamber 1 during intake stroke 154.

Various factors may affect how much internal combustion gas recirculation occurs. The amount of combustion gas that flows from exhaust passage 52 into combustion chamber 1 during intake stroke 154 may depend on how long and how far engine controls 26 hold exhaust valve 92 open during intake stroke 154. Similarly, the timing and duration of period 146, as well as how far intake valve 80 opens during period 146, may affect the amount of combustion gas that flows into intake passage 44 during period 146 and, thus, the amount of combustion gas that flows into combustion chamber 1 during intake stroke 154. Additionally, the pressures in combustion chamber 1, intake passage 44, and exhaust passage 52 during certain portions of power cycle 121 may affect the amount of combustion gas that flows into combustion chamber 1 during intake stroke 154. The events of power cycle 121 in combustion chamber 1 may affect these pressures. Additionally, events of power cycles in combustion chambers 2-4 may affect the pressures in intake passage 44 and exhaust passage 52.

Engine controls 26 may cause power cycles in combustion chambers 2-4 in various ways and at various times with respect to power cycles in combustion chamber 1. In some embodiments, engine controls 26 may cause each power cycle in each combustion chamber 2-4 in substantially the same manner that engine controls 26 cause power cycles 121, 152 in combustion chamber 1. Additionally, engine controls 26 may stagger the power cycles in combustion chambers 1-4 in the manner shown in FIG. 4. With the power cycles staggered as shown, each power stroke of a piston 14-17 may occur substantially simultaneously with an exhaust stroke of another piston 14-17.

Figure 4:
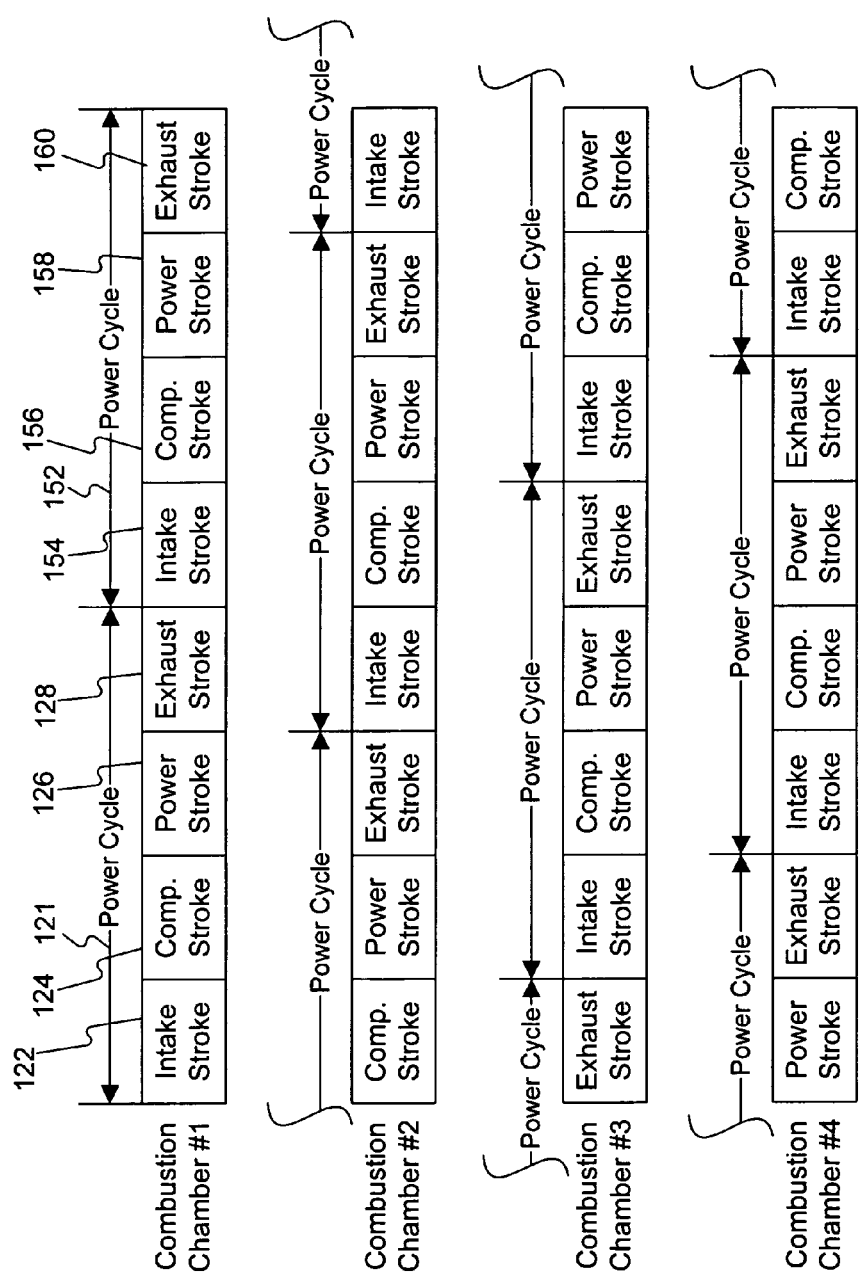
FIG. 4 is a chart showing one possible method for executing power cycles in four combustion chambers of an engine.
Figure 5:
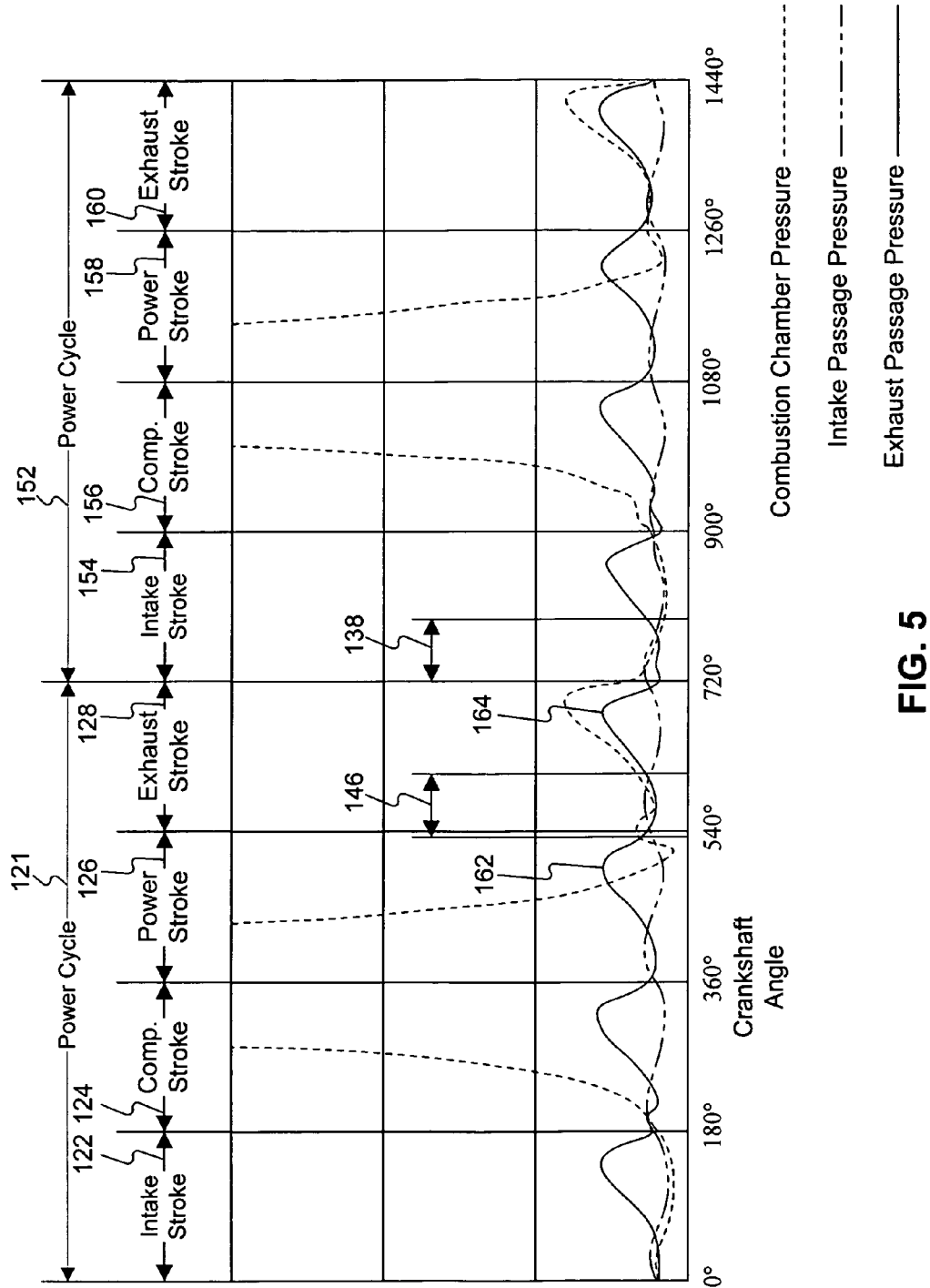
FIG. 5 is a graphical illustration of pressures in various portions of an engine over the same period of time shown in FIG. 2A under one set of operating conditions.

FIG. 5 graphically illustrates how the pressures in combustion chamber 1, intake passage 44, and exhaust passage 52 may vary over the course of power cycles 121, 152 when engine controls 26 combine the control strategy of FIGS. 2A-2D or the control strategy of FIGS. 3A-3D with the control strategy of FIG. 4 to operate engine 10 at low speed and under low load. Each exhaust stroke of engine 10 may cause the pressure in exhaust passage 52 to rise. With engine 10 operating under low load, each exhaust stroke may raise the pressure in exhaust passage 52 by a relatively small amount because the combustion gases released into exhaust manifold 88 have relatively low energy. Additionally, with engine 10 operating at low speed, the pressure in exhaust passage 52 may peak slightly over halfway through each exhaust stroke. For example, the exhaust stroke that occurs substantially simultaneously with power stroke 126 of power cycle 121 may cause a pressure peak 162 in exhaust passage 52 slightly over halfway through that exhaust stroke and power stroke 126. Similarly, exhaust stroke 128 of power cycle 121 may cause a pressure peak 164 in exhaust passage 52 slightly over halfway through exhaust stroke 128.

As a result of the conditions illustrated in FIG. 4, when engine 10 operates at low speed and under low load, the above-described valve control methods may provide relatively little internal combustion gas recirculation. Under these circumstances, the pressure in combustion chamber 1 remains near or above the pressure in exhaust passage 52 during most of period 138 when exhaust valve 92 is open during intake stroke 154. As a result, very little combustion gas returns from exhaust passage 52 to combustion chamber 1. Additionally, the pressures in combustion chamber 1 and exhaust passage 52 remain near or below the pressure in intake passage 44 during most of period 146 when intake valve 80 is open. Accordingly, relatively little combustion gas flows from combustion chamber 1 into intake passage 44 during period 146, resulting in relatively little combustion gas flowing from intake passage 44 into combustion chamber 1 during intake stroke 154.

Figure 6:
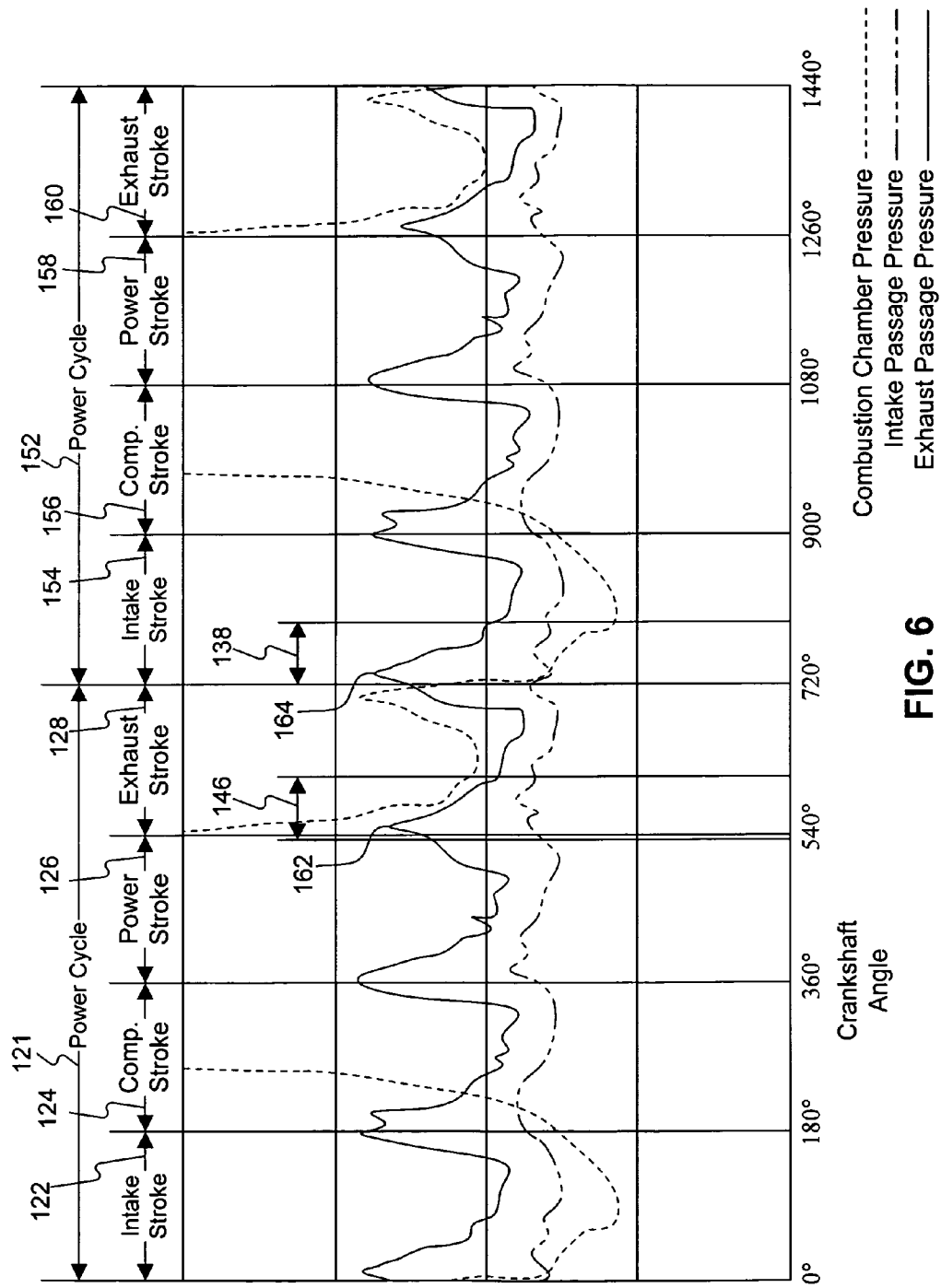
FIG. 6 is a graphical illustration of pressures in various portions of an engine over the same period of time shown in FIG. 2A under another set of operating conditions.

FIG. 6 graphically illustrates how the pressures in combustion chamber 1, intake passage 44, and exhaust passage 52 may vary over the course of power cycles 121, 152 when engine controls 26 combine the control strategy shown in FIGS. 2A-2D or the control strategy shown in FIGS. 3A-3D with the control strategy shown in FIG. 4 to operate engine 10 at higher speed and under high load. In particular, FIG. 6 illustrates these parameters when engine 10 operates at its rated speed and load. When engine 10 operates at high speed and under high load, the pressure fluctuations in combustion chamber 1, intake passage 44, and exhaust passage 52 may have approximately the same patterns as they do when engine 10 operates at low speed and under low load. However, with engine 10 combusting relatively large quantities of fuel during each power cycle to meet a high load, each exhaust stroke may produce significantly larger pressure rises in exhaust passage 52.

Additionally, with engine 10 operating at higher speed, crankshaft 60 and pistons 14-17 may move farther in the time it takes the pressure to peak in exhaust passage 52 in response to an exhaust stroke. As a result, the pressure peaks in exhaust passage 52 may occur later with respect to the various strokes of power cycle 121. For example, the exhaust stroke occurring substantially simultaneously with power stroke 126 may cause pressure peak 162 around the end of power stroke 126 and the beginning of exhaust stroke 128. Similarly, exhaust stroke 128 may cause pressure peak 164 around the end of exhaust stroke 128 and the beginning of intake stroke 154.

Under the conditions illustrated in FIG. 6, engine controls 26 may provide a relatively large amount of internal combustion gas recirculation. When engine 10 operates at high speed and power, the pressure in exhaust passage 52 may exceed the pressure in combustion chamber 1 by a significant amount over the course of period 138 when exhaust valve 92 is open during intake stroke 154. As a result, a significant amount of combustion gas may flow from exhaust passage 52 into combustion chamber 1 during period 138. In particular, under the conditions shown in FIG. 6, engine controls 26 may provide between about 5 and about 15 percent internal combustion gas recirculation from exhaust system 72 to combustion chamber 1. In other words, engine controls 26 may cause a quantity of combustion gas equal to between about 5 and about 15 percent of the quantity of combustion gas produced in combustion cycle 121 to flow from exhaust passage 52 into combustion chamber 1 during intake stroke 154. In some embodiments, engine controls 26 may provide less than about 10 percent internal combustion gas recirculation from exhaust system 72 when engine 10 operates at its rated speed and load.

Additionally, during period 146 when intake valve 80 is open, the pressure in combustion chamber 1 and the pressure in exhaust passage 52 may be significantly higher than the pressure in intake passage 44. Thus, a significant amount of combustion gas may flow from combustion chamber 1 into intake passage 44 during period 146. Subsequently, a significant amount of combustion gas may flow from intake passage 44 into combustion chamber 1 during intake stroke 154. Thus, under the conditions shown in FIG. 6, engine controls 26 may provide between about 5 and about 15 percent internal combustion gas recirculation from intake system 70 to combustion chamber 1. In other words, engine controls 26 may cause a quantity of combustion gas equal to between about 5 and about 15 percent of the quantity of combustion gas produced in combustion cycle 121 to flow from intake passage 44 into combustion chamber 1 during intake stroke 154. In some embodiments, engine controls 26 may limit the amount of internal combustion gas recirculation from intake system 70 when engine 10 operates at its rated speed and load to about 10 percent internal combustion gas recirculation.

Thus, when operating engine 10 at its rated load and speed, engine controls 26 may cause an amount of internal combustion gas recirculation from exhaust system 72 that constitutes between about half and about twice the amount of internal combustion gas recirculation from intake system 70. In some embodiments, engine controls 26 may cause the amount of internal combustion gas recirculation from exhaust system 72 to even more closely approximate the amount of internal combustion gas recirculation from intake system 70 when engine 10 operates at its rated load and speed. For example, engine controls 26 may cause internal combustion gas recirculation from exhaust system 72 to occur in an amount between about 125 and about 175 percent of the amount of internal combustion gas recirculation from intake system 70 when engine 10 operates at its rated speed and load. Additionally, in some embodiments, engine controls 26 may limit the aggregate internal combustion gas recirculation from intake system 70 and exhaust system 72 when engine 10 operates at rated speed and load to about 15 percent internal combustion gas recirculation.

FIGS. 5 and 6 anecdotally demonstrate a general relationship: as engine speed and load increase, the pressure differential between exhaust passage 52 and intake passage 44 during periods 138 and 146 may increase. As a result, utilizing the above-described valve-control methods may ensure that the amount of internal combustion gas recirculation from intake system 70 and the amount of internal combustion gas recirculation from exhaust system 72 correlates with engine speed and load. Opening intake valve 80 before power stroke 126 ends, even if only slightly before, significantly contributes to this result, as the pressure differential between exhaust passage 52 and intake passage 44 at the end of power stroke 126 strongly correlates to engine speed and load.

Methods according to which engine controls 26 may operate engine 10 are not limited to the examples shown in the figures and discussed above. In some embodiments, during power cycles 121, 152, engine controls 26 may open and close intake valve 80 and/or open and close exhaust valve 92 additional times. For example, rather than opening exhaust valve 92 for exhaust stroke 128 and holding it open into intake stroke 154, engine controls 26 may open and close exhaust valve 92 once for exhaust stroke 128 and then reopen exhaust valve 92 for intake stroke 154. Additionally, in embodiments where engine controls 26 are capable of controlling valves 80-83, 92-95 at least partially independently of crankshaft 60, engine controls 26 may control valves 80-83, 92-95 differently in any one power cycle than it did in previous power cycles. Additionally, engine controls 26 may cause a power cycle that omits one or more of the strokes discussed above or includes additional strokes, such as one or more additional compression strokes and/or one or more additional power strokes. Furthermore, engine controls 26 may cause power cycles in combustion chambers 1-4 in different orders and/or at different intervals than shown in FIG. 4. Moreover, in some embodiments, engine 10 may include only combustion chambers 1-3, and engine controls 26 may implement the method shown in FIGS. 3A-3D while staggering power cycles between combustion chambers 1-3 in an appropriate manner for an engine having three combustion chambers.

The disclosed embodiments may provide a number of performance advantages. Causing similar amounts of internal combustion gas recirculation from intake system 70 and from exhaust system 72 may allow recirculating a relatively high total quantity of combustion gas, without recirculating an undesirably large quantity of combustion gas from either intake system 70 or exhaust system 72. Keeping the amount of internal combustion gas recirculation from intake system 70 relatively small may help keep intake air supplied to combustion chamber 1 at a desirably low temperature. Recycling a relatively small quantity of combustion gas from exhaust system 72 may keep the velocity of combustion gas flowing from exhaust passage 52 into combustion chamber 1 relatively low, thereby allowing intake air to flow into combustion chamber 1 relatively undisturbed.

Additionally, the disclosed embodiments may ensure good throttle response and low $NO_x$ emissions over a wide range of engine speeds and loads. Increasing speeds and loads may increase pressures and temperatures in combustion chambers 1-4, which may tend to increase $NO_x$ emissions. Recirculating increasing amounts of combustion gas may counteract this tendency. Additionally, as speed and load increases, recirculating combustion gas compromises throttle response less. Conversely, as speed and load decrease, $NO_x$ emissions tend to diminish, and recycling combustion gas compromises throttle response more. By recirculating combustion gas at a rate that correlates with engine speed and load, the disclosed embodiments may maintain low $NO_x$ emissions and good throttle response as engine speed and load varies. Opening intake valve 80 before power stroke 126 ends, even if only slightly before, significantly contributes to achieving this result because, as is discussed above, this significantly contributes to a strong correlation between the amount of combustion gas recycled and engine speed and load.

Additionally, plateauing the opening of exhaust valve 92 during at least a portion of intake stroke 154 may provide certain performance advantages. By doing so, engine controls 26 may provide a relatively large window of time and space for combustion gas to flow from exhaust passage 52 into combustion chamber 1 during intake stroke 154, while keeping the maximum opening of exhaust valve 92 during intake stroke 154 relatively small. Keeping the maximum opening of exhaust valve 92 during intake stroke 154 relatively small may further help prevent combustion gas flowing from exhaust passage 52 into combustion chamber 1 at an undesirably high rate and disturbing air flowing from intake passage 44 into combustion chamber 1.

Furthermore, decreasing and then increasing the opening of exhaust valve 92 after exhaust stroke 128 begins may also provide a number of performance advantages. Decreasing the opening of exhaust valve 92 may ensure that piston 14 and valve 92 do not collide during exhaust stroke 128, and subsequently increasing the opening of exhaust 92 may allow a relatively large amount of combustion gas to flow from exhaust passage 52 into combustion chamber 1. Additionally, decreasing the opening of exhaust valve 92 as exhaust stroke 128 progresses may inhibit exhaust gas leaving combustion chamber 1 during exhaust stroke 128, which may also tend to enhance the amount of combustion gas in combustion chamber 1 during intake stroke 154.

It will be apparent to those skilled in the art that various modifications and variations can be made in the engine and methods without departing from the scope of the disclosure. Other embodiments of the disclosed engine and methods will be apparent to those skilled in the art from consideration of the specification and practice of the engine and methods disclosed herein. It is intended that the specification and examples be considered as exemplary only, with a true scope of the disclosure being indicated by the following claims and their equivalents.

What is claimed is:

1. A method of operating an engine, the engine having a housing with a combustion chamber, a piston disposed adjacent the combustion chamber, a crankshaft connected to the piston, an intake valve associated with the combustion chamber, and an exhaust valve associated with the combustion chamber, the method comprising:
   opening the intake valve between about 15 degrees of crankshaft rotation before a power stroke ends and the end of the power stroke;
   closing the intake valve after at least about 65 degrees of crankshaft rotation after the end of the power stroke and before a subsequent exhaust stroke of the piston ends;
   causing the exhaust valve to be open for part of an intake stroke of the piston; and
   closing the exhaust valve at least about 30 degrees of crankshaft rotation after the intake stroke begins.

2. The method of claim 1, wherein causing the exhaust valve to be open for part of the intake stroke includes substantially plateauing the opening of the exhaust valve during at least a portion of the intake stroke.

3. The method of claim 1, wherein causing the exhaust valve to be open for part of the intake stroke includes:
   during at least a portion of the intake stroke, substantially plateauing the opening of the exhaust valve at an amount between about 5 and about 20 percent of a peak opening of the exhaust valve during the exhaust stroke.

4. The method of claim 1, wherein causing the exhaust valve to be open for part of the intake stroke includes maintaining the opening of the exhaust valve during the intake stroke less than about 20 percent of a peak opening of the exhaust valve during the exhaust stroke.

5. The method of claim 1, wherein closing the exhaust valve at least about 40 degrees of crankshaft rotation after the intake stroke begins includes closing the exhaust valve less than about 90 degrees of crankshaft rotation after the intake stroke begins.

6. The method of claim 1, wherein closing the exhaust valve at least about 30 degrees of crankshaft rotation after the intake stroke begins includes closing the exhaust valve at least about 40 degrees of crankshaft rotation after the intake stroke begins.

7. An engine, comprising:
a housing having a combustion chamber;
a piston disposed adjacent the combustion chamber;
a crankshaft connected to the piston;
engine controls, including an exhaust valve associated with the combustion chamber, wherein the engine controls are operable to, after an exhaust stroke of the piston begins, reduce an opening of the exhaust valve, then increase the opening of the exhaust valve, before closing the exhaust valve after a subsequent intake stroke of the piston begins.

8. The engine of claim 7, wherein closing the exhaust valve after the intake stroke begins includes closing the exhaust valve at least about 40 degrees of crankshaft rotation after the intake stroke begins.

9. The engine of claim 7, wherein reducing the opening of the exhaust valve then increasing the opening of the exhaust valve includes transitioning from reducing the opening of the exhaust valve to increasing the opening of the exhaust valve at least about 160 degrees of crankshaft rotation after the exhaust stroke begins.

10. The engine of claim 7, wherein the engine controls are further operable to
between transitioning from decreasing to increasing the opening of the exhaust valve and closing the exhaust valve, peaking the opening of the exhaust valve at an amount of less than about 20 percent of a peak opening of the exhaust valve during the exhaust stroke.

11. The engine of claim 7, wherein the engine controls are further operable to
between transitioning from decreasing to increasing the opening of the exhaust valve and closing the exhaust valve, peaking the opening of the exhaust valve at an amount of between about 5 and about 20 percent of a peak opening of the exhaust valve during the exhaust stroke.

12. The engine of claim 7, wherein reducing the opening of the exhaust valve then increasing the opening of the exhaust valve includes transitioning from reducing the opening of the exhaust valve to increasing the opening of the exhaust valve less than about 200 degrees of crankshaft rotation after the exhaust stroke begins.

13. The engine of claim 7, wherein reducing the opening of the exhaust valve then increasing the opening of the exhaust valve includes transitioning from reducing the opening of the exhaust valve to increasing the opening of the exhaust valve between about 160 degrees and about 200 degrees of crankshaft rotation after the exhaust stroke begins.

14. The engine of claim 7, wherein:
the engine controls further include an intake valve associated with the combustion chamber;
the engine controls are further operable to
open the intake valve after a power stroke of the piston begins, and
close the intake valve before a subsequent exhaust stroke of the piston ends.

15. A method of operating an engine, the engine having a housing with a combustion chamber, a piston disposed adjacent the combustion chamber, and a crankshaft connected to the piston, the method comprising:
in at least some circumstances, providing at least about 5 percent internal combustion gas recirculation from an intake system of the engine to the combustion chamber; and
in at least some circumstances, providing at least about 5 percent internal combustion gas recirculation from an exhaust system of the engine to the combustion chamber.

16. The method of claim 15, wherein providing at least about 5 percent internal combustion gas recirculation from the intake system to the combustion chamber includes opening an intake valve associated with the combustion chamber less than about 30 degrees of crankshaft rotation before a power stroke of the piston ends and closing the intake valve less than about 80 degrees of crankshaft rotation after a subsequent exhaust stroke of the piston begins.

17. The method of claim 15, wherein providing at least about 5 percent internal combustion gas recirculation from the intake system to the combustion chamber includes providing less than about 15 percent internal combustion gas recirculation from the intake system to the combustion chamber.

18. The method of claim 15, wherein providing at least about 5 percent internal combustion gas recirculation from the exhaust system to the combustion chamber includes providing less than about 15 percent internal combustion gas recirculation from the exhaust system to the combustion chamber.

19. The method of claim 15, wherein:
providing at least about 5 percent internal combustion gas recirculation from the intake system to the combustion chamber in some circumstances includes providing at least about 5 percent internal combustion gas recirculation from the intake system to the combustion chamber when operating the engine at its rated speed and load; and
providing at least about 5 percent internal combustion gas recirculation from the exhaust system to the combustion chamber in some circumstances includes providing at least about 5 percent internal combustion gas recirculation from the exhaust system to the combustion chamber when operating the engine at its rated speed and load.

20. A method of operating an engine, the engine having a housing with a combustion chamber, a piston disposed adjacent the combustion chamber, and a crankshaft connected to the piston, the method comprising:
providing internal combustion gas recirculation from an intake system of the engine to the combustion chamber in an amount correlated to engine speed and load, so that in at least some circumstances, at least about 5 percent internal combustion gas recirculates from the intake system to the combustion chamber; and
providing internal combustion gas recirculation from an exhaust system of the engine to the combustion chamber in an amount correlated to engine speed and load.

21. The method of claim 20, wherein providing internal combustion gas recirculation from the exhaust system to the combustion chamber in an amount correlated to engine speed and load includes, in at least some circumstances, providing at least about 5 percent internal combustion gas recirculation from the exhaust system to the combustion chamber.

22. The method of claim 20, wherein providing internal combustion gas recirculation from the intake system to the combustion chamber in an amount correlated to engine speed and load includes causing an intake valve associated with the combustion chamber to be open for at least a portion of at least one of a power stroke of the piston and an exhaust stroke of the piston.

23. A method of operating an engine, the engine having a housing with a combustion chamber, a piston disposed adjacent the combustion chamber, and a crankshaft connected to the piston, the method comprising:
opening an intake valve associated with the combustion chamber between about 15 degrees of crankshaft rotation before a power stroke of the piston ends and the end of the power stroke;
closing the intake valve before a subsequent exhaust stroke of the piston ends; and
between opening the intake valve before the power stroke ends and closing the intake valve before the exhaust stroke ends, peaking the opening of the intake valve at an amount less than about 20 percent of a peak opening of the intake valve during an intake stroke of the piston.

24. The method of claim 23, further including substantially plateauing the opening of an exhaust valve associated with the combustion chamber during at least a portion of an intake stroke of the piston.

25. The method of claim 23, wherein closing the intake valve before the exhaust stroke ends includes closing the intake valve at least about 65 degrees of crankshaft rotation after the exhaust stroke begins.

26. The method of claim 23, further including:
between opening the intake valve before the power stroke ends and closing the intake valve before the exhaust stroke ends, peaking the opening of the intake valve at an amount between about 5 percent and about 20 percent of the peak opening of the intake valve during the intake stroke of the piston.

27. The method of claim 23, further including:
causing an exhaust valve to be open for part of an intake stroke of the piston that follows the exhaust stroke; and
closing the exhaust valve at least about 30 degrees of crankshaft rotation after the intake stroke begins.

28. A method of operating an engine, the engine having a housing with a combustion chamber, a piston disposed adjacent the combustion chamber, and a crankshaft connected to the piston, the method comprising:
providing internal combustion gas recirculation from an intake system of the engine to the combustion chamber, including opening an intake valve associated with the combustion chamber after a power stroke of the piston begins and closing the intake valve before a subsequent exhaust stroke of the piston ends; and
in at least some circumstances, providing at least about 5 percent internal combustion gas recirculation from an exhaust system of the engine to the combustion chamber.

29. The method of claim 28, wherein opening the intake valve after the power stroke begins includes opening the intake valve before the power stroke ends.

30. The method of claim 28, wherein closing the intake valve before the exhaust stroke ends includes closing the intake valve less than about 80 degrees of crankshaft rotation after the exhaust stroke begins.

31. The method of claim 28, wherein providing at least about 5 percent internal combustion gas recirculation from the exhaust system to the combustion chamber includes providing less than about 15 percent internal combustion gas recirculation from the exhaust system to the combustion chamber.

32. The method of claim 28, wherein providing internal combustion gas recirculation from the intake system to the combustion chamber includes providing less than about 15 percent internal combustion gas recirculation from the intake system to the combustion chamber.

33. The method of claim 28, wherein providing internal combustion gas recirculation from the intake system to the combustion chamber includes providing internal combustion gas recirculation from the intake system to the combustion chamber in an amount correlated to engine speed and load.

34. A method of operating an engine, the engine having a housing with a combustion chamber, a piston disposed adjacent the combustion chamber, and a crankshaft connected to the piston, the method comprising:
when operating the engine at its rated speed and load
providing a first amount of internal combustion gas recirculation from an intake system of the engine to the combustion chamber;
providing a second amount of internal combustion gas recirculation from an exhaust system of the engine to the combustion chamber, the second amount being at least about half of the first amount.

35. The method of claim 34, wherein, in at least some circumstances, the second amount is less than about twice the first amount.

36. The method of claim 34, wherein, in at least some circumstances, the second amount is between about 125 percent and about 175 percent of the first amount.

37. The method of claim 34, wherein the first amount and the second amount are correlated to engine speed and load.

38. The method of claim 34, wherein providing the first amount of internal combustion gas recirculation from the intake system of the engine to the combustion chamber includes opening an intake valve associated with the combustion chamber after a power stroke of the piston begins and closing the intake valve before a subsequent exhaust stroke of the piston begins.

39. A method of operating an engine, the engine having a housing with a combustion chamber, a piston disposed adjacent the combustion chamber, a crankshaft connected to the piston, an intake valve associated with the combustion chamber, and an exhaust valve associated with the combustion chamber, the method comprising:
opening the intake valve before about 15 degrees of crankshaft rotation before an end of a power stroke;
closing the intake valve after at least about 65 degrees of crankshaft rotation after the end of the power stroke and before a subsequent exhaust stroke of the piston ends;
causing an exhaust valve to be open for at least a portion of the intake stroke of the piston, including substantially plateauing the opening of the exhaust valve for at least a portion of the intake stroke; and
closing the exhaust valve before the intake stroke ends.

40. The method of claim 39, further including:
between opening the intake valve and closing the intake valve, peaking the opening of the intake valve at an amount between about 5 percent and about 20 percent of a peak opening of the intake valve during the intake stroke.

41. The method of claim 39, wherein closing the intake valve includes closing the intake valve less than about 80 degrees of crankshaft rotation after the exhaust stroke begins.

42. The method of claim 39, wherein substantially plateauing the opening of the exhaust valve includes substantially plateauing the opening of the exhaust valve at an amount of at least about 5 percent of a peak opening of the exhaust valve during the exhaust stroke.

43. The method of claim 42, wherein closing the exhaust valve before the intake stroke ends includes closing the exhaust valve at least about 40 degrees of crankshaft rotation after the intake stroke begins.

44. The method of claim 42, wherein substantially plateauing the opening of the exhaust valve at an amount of at least about 5 percent of a peak opening of the exhaust valve during the exhaust stroke includes substantially plateauing the opening of the exhaust valve at an amount of less than about 20 percent of the peak opening of the exhaust valve during the exhaust stroke.

45. The method of claim 44, wherein closing the exhaust valve before the intake stroke ends includes closing the exhaust valve at least about 40 degrees of crankshaft rotation after the intake stroke begins.

* * * * *